(12) United States Patent
Chen

(10) Patent No.: US 7,114,738 B1
(45) Date of Patent: Oct. 3, 2006

(54) BICYCLE FRAME FOR CONCEALING DERAILLEUR WIRE

(75) Inventor: Tsang-Ping Chen, Taichung Hsien (TW)

(73) Assignee: Yoan Technologies Co., Ltd., Taichung Hsien (TW)

( * ) Notice: Subject to any disclaimer, the term of this patent is extended or adjusted under 35 U.S.C. 154(b) by 0 days.

(21) Appl. No.: 11/159,195

(22) Filed: Jun. 23, 2005

(30) Foreign Application Priority Data

Apr. 14, 2005 (TW) ............................. 94205854 U

(51) Int. Cl.
*B62K 19/00* (2006.01)

(52) U.S. Cl. .................................................. 280/281.1

(58) Field of Classification Search ............. 280/281.1, 280/275, 288.1

See application file for complete search history.

(56) References Cited

U.S. PATENT DOCUMENTS

| | | | |
|---|---|---|---|
| 4,768,798 A * | 9/1988 | Reed et al. .............. | 280/281.1 |
| 4,917,397 A * | 4/1990 | Chonan .................... | 280/281.1 |
| 5,411,280 A * | 5/1995 | Allsop et al. ............. | 280/281.1 |
| 5,433,465 A * | 7/1995 | Klein et al. .............. | 280/281.1 |
| 5,456,481 A * | 10/1995 | Allsop et al. ............. | 280/281.1 |
| 5,470,091 A * | 11/1995 | Voss et al. ................ | 280/281.1 |
| 5,478,100 A * | 12/1995 | McDermitt et al. ....... | 280/281.1 |
| 6,983,949 B1 * | 1/2006 | Ueno et al. ................. | 280/279 |
| 2004/0188976 A1 * | 9/2004 | Schmider ..................... | 280/279 |
| 2005/0057017 A1 * | 3/2005 | Hara et al. ................... | 280/279 |

* cited by examiner

*Primary Examiner*—Kevin Hurley
(74) *Attorney, Agent, or Firm*—Rosenberg, Klein & Lee

(57) ABSTRACT

A bicycle frame includes two first through holes respectively defined in two opposed points in a periphery of the head tube to communicate with the down tube so as to allow extension of a first derailleur cable for a front derailleur and a second derailleur cable for a rear derailleur. The bottom bracket has a down tube hole for communication with an interior of the down tube, two chain stay holes for communication with each of the two chain stays and two bellow tube holes for extension of two a first bellow tube and a second bellow tube respectively received in the bottom bracket. The derailleur cables extend to the first bellow tubes and the second bellow tubes respectively, which in turn extend out of the bottom bracket and toward the extension holes of the inner tubes for connection to the front and rear derailleurs.

4 Claims, 6 Drawing Sheets

BICYCLE FRAME FOR CONCEALING DERAILLEUR WIRE

BACKGROUND OF THE INVENTION

1. Field of the Invention

The present invention relates to a bicycle frame, and more particularly to a bicycle frame being so configured that a derailleur wire is concealed.

2. Description of Related Art

A bicycle having a derailleur mounted at the rear of the bicycle normally has at least one derailleur wire extending from the handlebars to the derailleur so that the rider is able to use the derailleur wire to control movement of the derailleur. After the derailleur is moved, the transmission chain is shifted to a different gear such that different output torque is generated if the applied force to the pedal of the bicycle remains the same. Normally the derailleur wire is exposed outside the bicycle frame such that the wire is easily corroded or does harm to the rider. Thus, it is preferable to conceal the derailleur wire inside the bicycle frame. However, none of the bicycle frames available on the market is able to provide such a capability.

To overcome the shortcomings, the present invention tends to provide an improved bicycle frame to mitigate the aforementioned problems.

SUMMARY OF THE INVENTION

The primary objective of the present invention is to provide a bicycle frame for concealing derailleur wires. The bicycle frame is composed of a head tube, a crossbar extending from the head tube, a down tube extending from the head tube, a seat tube connecting to the crossbar and the down tube, a seat stay extending from the seat tube, two chain stays and a bottom bracket interconnecting the down tube, the seat tube and the two chain stays, as well as providing a passage for an axle.

In one aspect of the present invention, the head tube has two first through holes respectively defined in two opposed points in a periphery of the head tube to communicate with the down tube so as to allow extension of a first derailleur cable for a front derailleur and a second derailleur cable for a rear derailleur.

In yet another aspect of the present invention, the down tube of the present invention has two cable tubes received therein to communicate with the head tube and extending toward the bottom bracket.

A further aspect of the present invention is that the bottom bracket has an axle hole, a down tube hole for communication with an interior of the down tube, two chain stay holes for communication with each of the two chain stays and two bellow tube holes for extension of two bellow tubes received in the bottom bracket.

Still a further objective of the present invention is that a rear end of the chain stay is provided with a rear wheel axel connector for connection to the rear wheel axel and the rear derailleur and having an inner tube received in one of the two chain stays, wherein the inner tube has an extension hole in communication with the corresponding one of the chain stays and the ambient air. The inner tube has a flared opening inside the corresponding chain stay so that the derailleur cable is able to be guided by the flared opening and extends out of the rear wheel axle connector for connection with the rear derailleur.

Other objects, advantages and novel features of the invention will become more apparent from the following detailed description when taken in conjunction with the accompanying drawings.

DETAILED DESCRIPTION OF THE PREFERRED EMBODIMENT

Figures 1A, 1B:
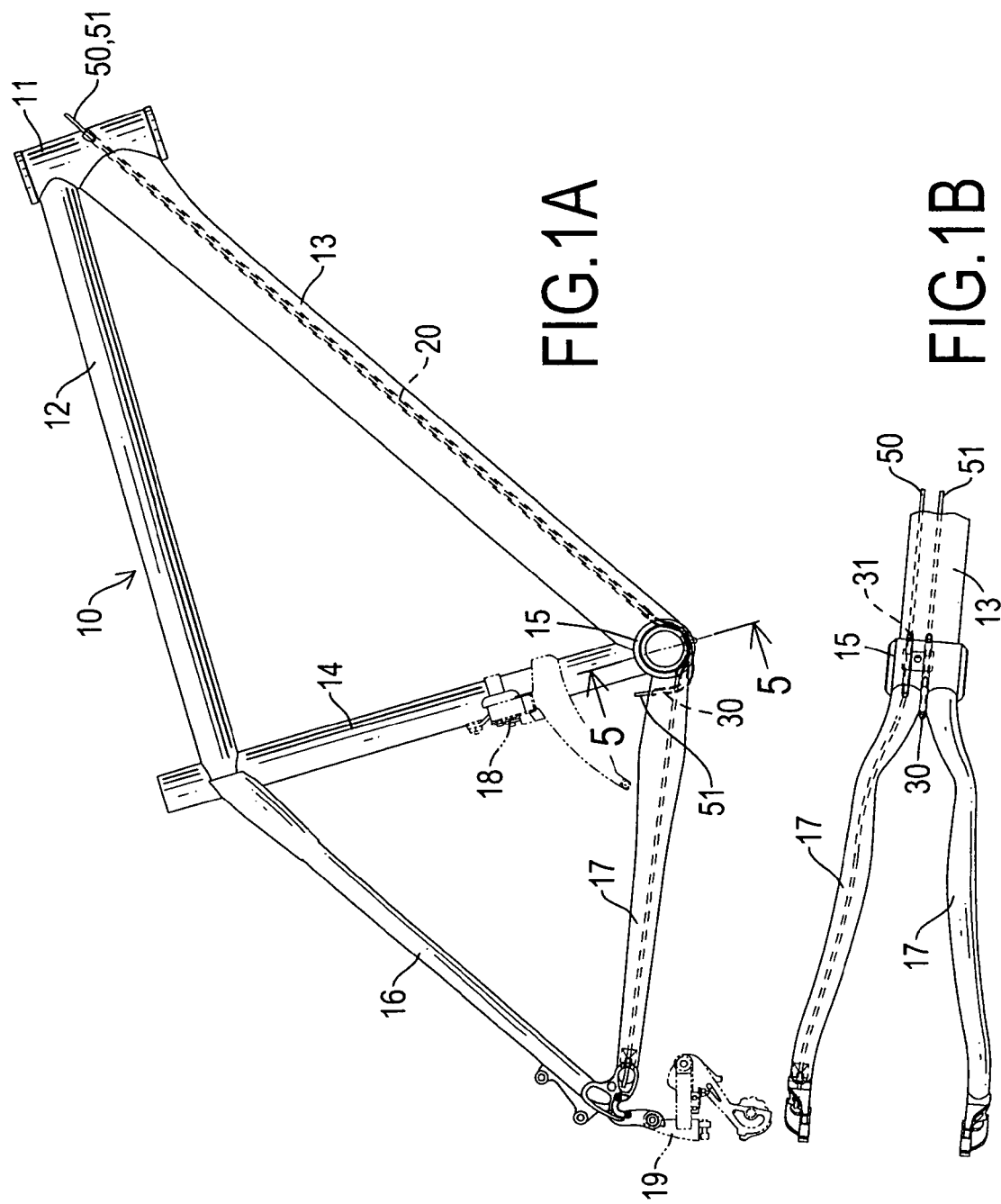
FIG. 1 shows a top plan view and a side view of the bicycle frame of the present invention.

With reference to FIG. 1, it is noted that the bicycle frame (10) in accordance with the present invention includes a head tube (11), a crossbar (12), a down tube (13), a seat tube (14), two seat stays (16), two chain stays (17) and a bottom bracket (15) interconnecting with the down tube (13), the seat tube (14) and the two chain stays (17).

Figure 2:
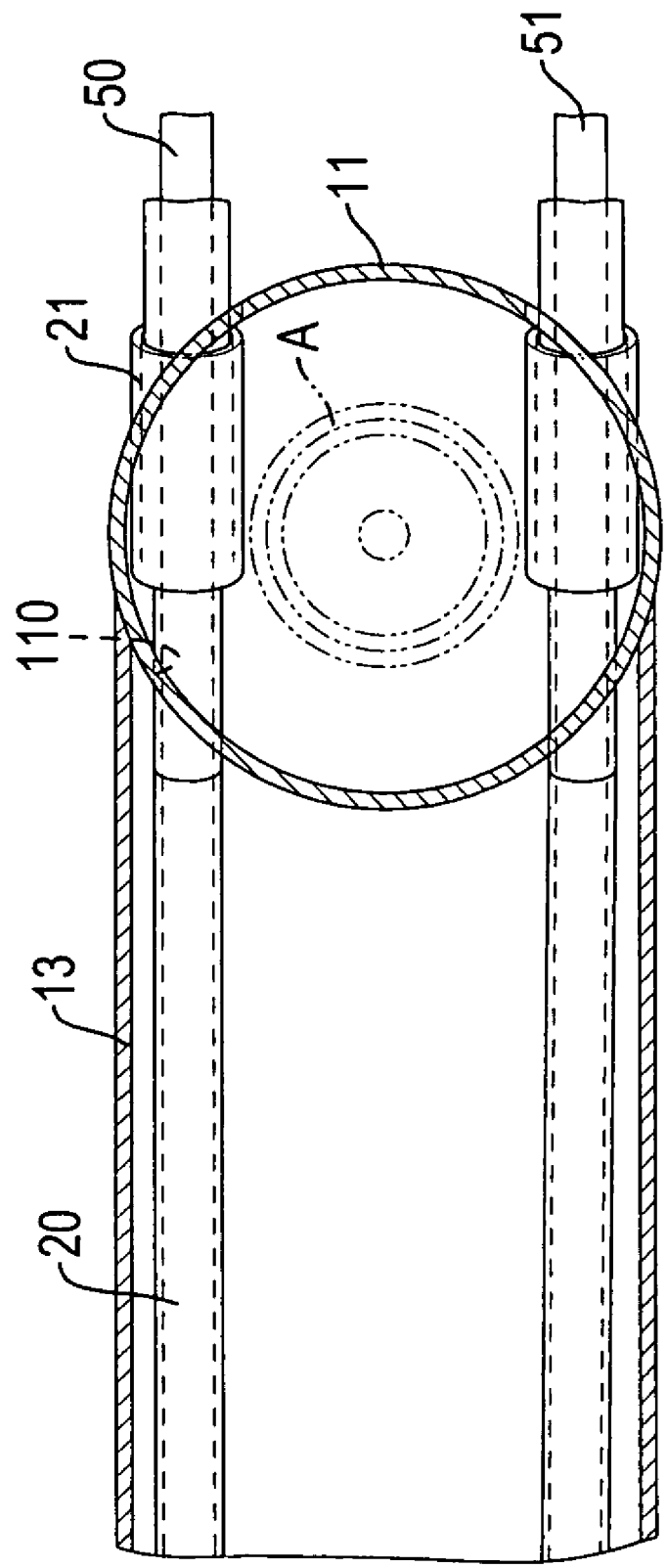
FIG. 2 is a top plan view of the head tube in section.

With reference to FIG. 2 and still using FIG. 1 for reference, the head tube (11) has two first through holes (110) respectively defined in two opposed points in a periphery of the head tube (11) to communicate with an interior of the down tube (13) so as to allow extension of a first derailleur cable (50) for a front derailleur and a second derailleur cable (51) for a rear derailleur. It is to be noted that the position of the first through holes (110) is at the periphery away from the stem (A).

The down tube (13) of the present invention has two cable tubes (20) received therein to communicate with the head tube (11) and extending toward the bottom bracket (15). In a preferred embodiment, two connecting tubes (21) are firmly and respectively received in the two first through holes (110) of the head tube (11) to connect to and communicate with the two cable tubes (20). It is noted that a front derailleur (18) is mounted on the seat tube (14) and a rear derailleur (19) is mounted at the rear end of the chain stays (17).

Figure 3:
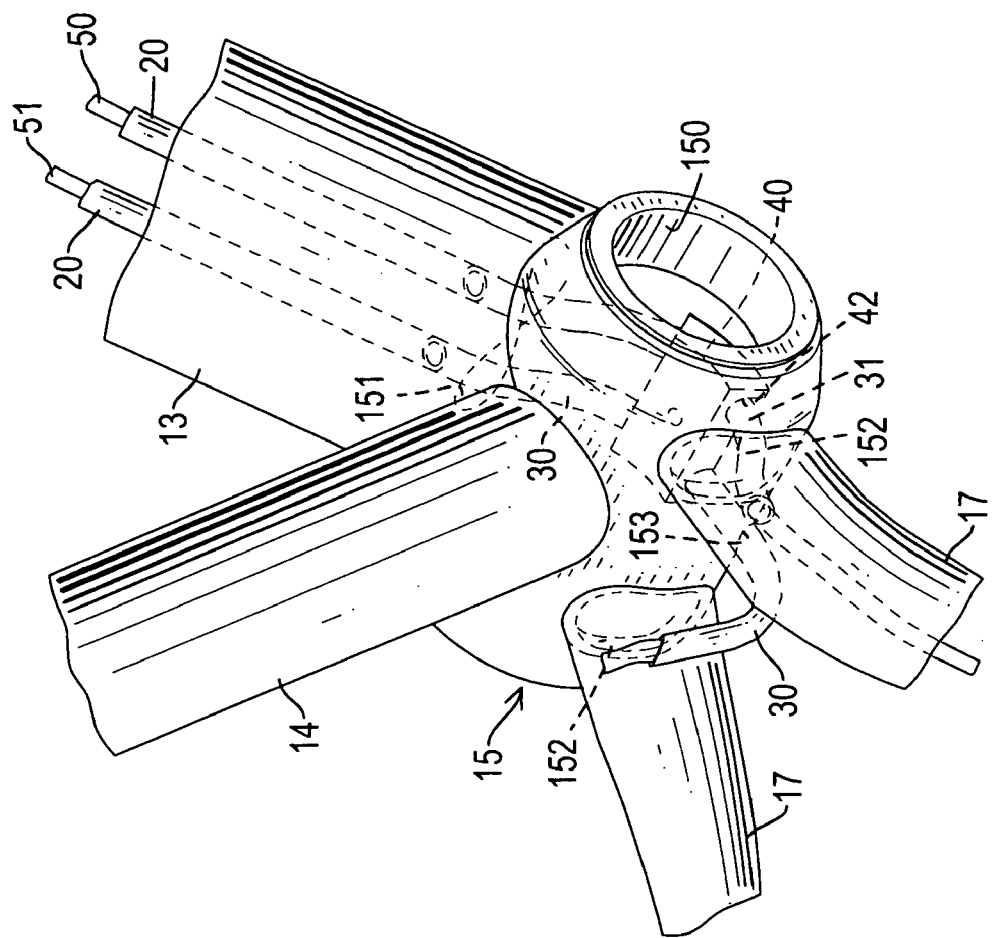
FIG. 3 is a schematic perspective view showing the connection among the bottom bracket, the down tube, the seat tube and the chain stays.
Figure 4:
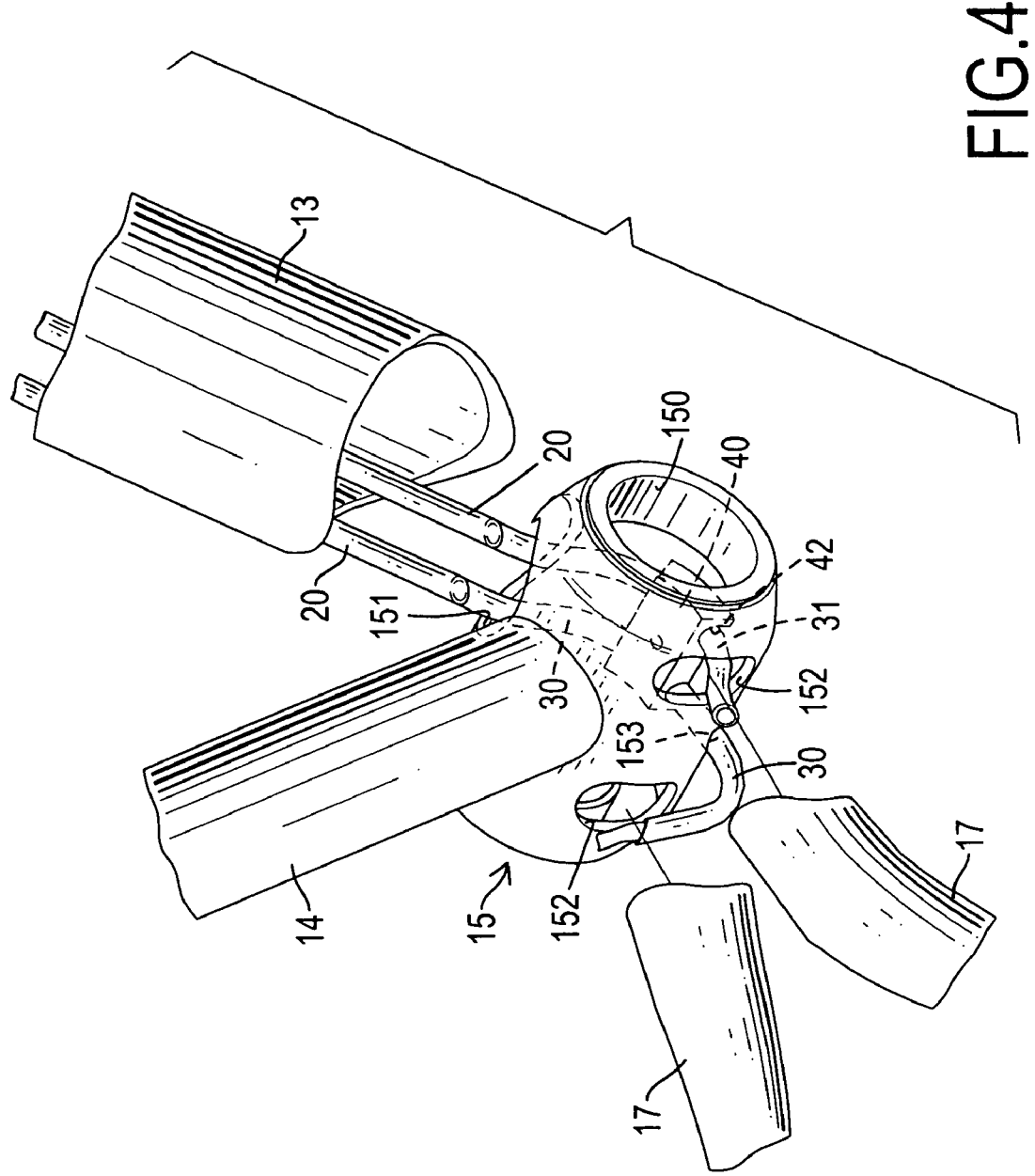
FIG. 4 is an exploded perspective view showing that cable tubes inside the down tube are extended out of the down tube for connection with two bellow tubes.
Figure 5:
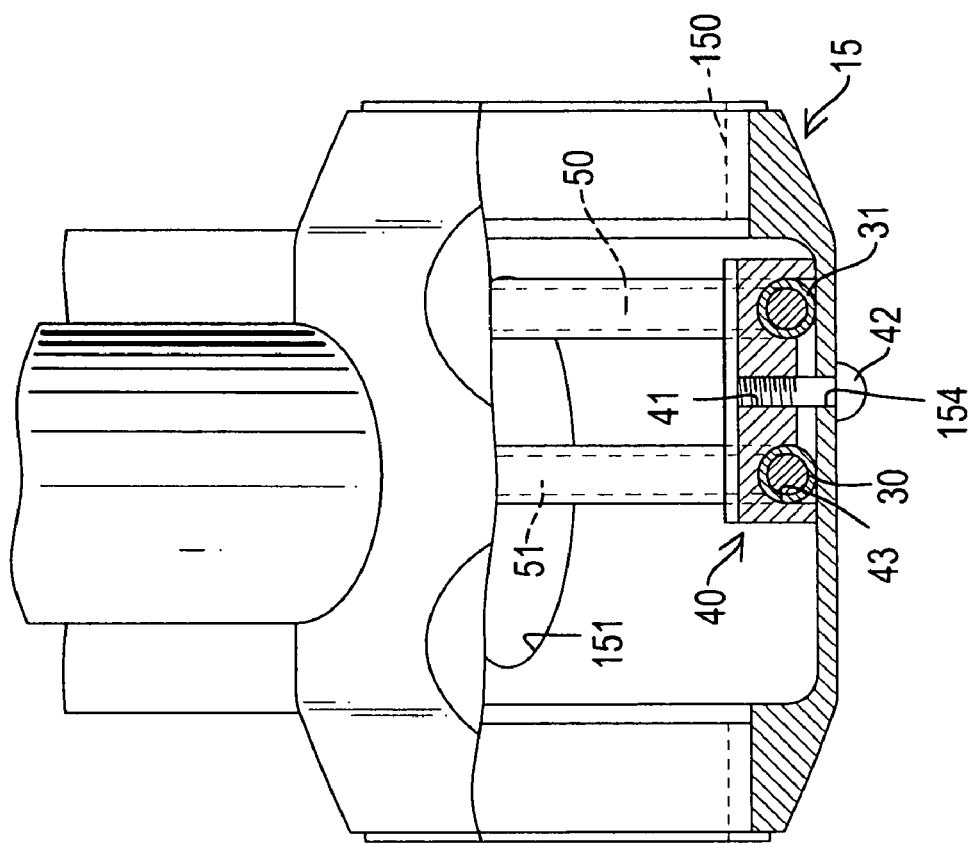
FIG. 5 is a partial cross sectional view of the bottom bracket.

With reference to FIGS. 3–5, the bottom bracket (15) has an axle hole (150), a down tube hole (151) for communication with an interior of the down tube (13), two chain stay holes (152) for respective communication with the two chain stays (17), a first bellow tube (30) and a second bellow tube (31), and two bellow tube holes (153) for respective extension of the two bellow tubes (30,31), respectively received in the bottom bracket (15). A bottom hole (154) is defined through a bottom face of the bottom bracket (15). A positioning plate (40) is received inside the bottom bracket (15) and has a threaded hole (41) for extension of a threaded bolt (42) after extending through the bottom hole (154) and two sectorial recesses (43) defined in a side face of the positioning plate (40) for respectively receiving therein a portion of the first bellow tube (30) and the second bellow tube (31) so as to position the first bellow tube (30) and the second bellow tube (31) inside the bottom bracket (15).

Figure 6:
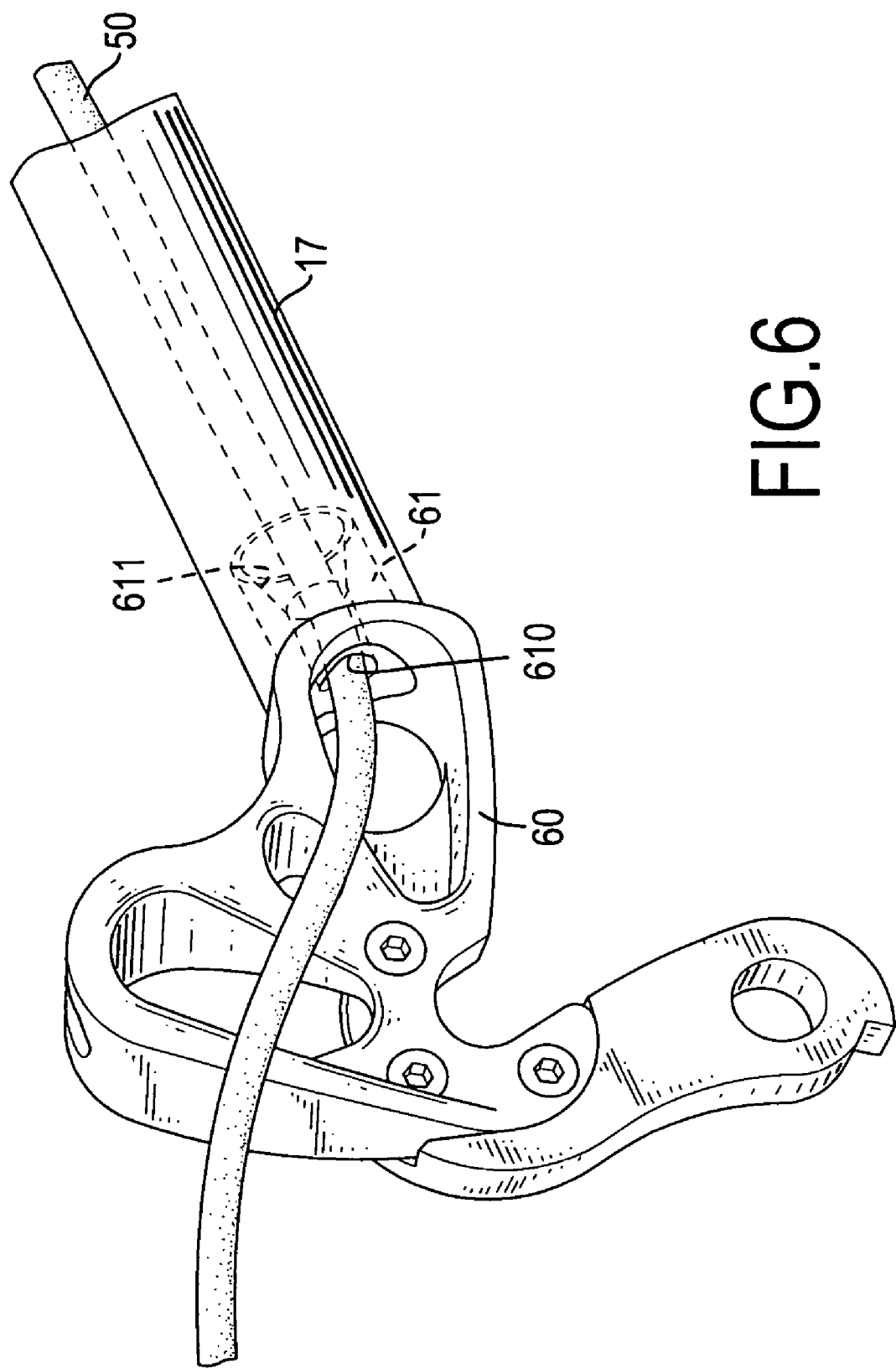
FIG. 6 is a perspective view showing the rear axle connector connected to the rear end of the chain stay.

With reference to FIGS. 4 and 6, a rear end of one of the chain stays (17) is provided with a rear wheel axle connector (60) for connection to the rear wheel axle and the rear derailleur (19) and having an inner tube (61) received in the respective chain stay (17). The inner tube (61) has an extension hole (610) in communication with the chain stay (17) and the ambient air. A lower portion of the seat tube (14) has an egress (Y) defined between a distal end of the seat tube (14) and received in the bottom bracket (15) and a mounting position for the front derailleur (18). The inner tube (61) aligns with the egress (Y) whereby the first derailleur cable (50) can exit from the extension hole (610) and connect to the rear derailleur (19) and the second derailleur cable (51) after extending out one of the two bellow tube holes (153) is able to connect to the front derailleur (18). Each inner tube (61) has a flared opening (611) inside the frame (10) so that the derailleur cable (50 or 51) is able to be guided by the flared opening (611) and extends out of the frame for respective connection with the front and rear derailleur (18, 19).

From the above description, it is noted that the first derailleur cable (50) and the second derailleur cable (51) are concealed inside the bicycle frame of the present invention.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. In a bicycle frame having a head tube, a crossbar extending from the head tube, a down tube extending from the head tube, a seat tube connecting to the crossbar and the down tube, two seat stays extending from the seat tube, two chain stays and a bottom bracket interconnecting the down tube, the seat tube and the two chain stays, wherein the improvement comprises:

the head tube has two first through holes respectively defined in two opposed points in a periphery of the head tube to communicate with the down tube so as to allow extension of a first derailleur cable for a rear derailleur and a second derailleur cable for a front derailleur, the down tube has two cable tubes received therein to communicate with the head tube and extending toward the bottom bracket, the two cable tubes are connected to and communicate with two connecting tubes firmly and respectively received in the two first through holes of the head tube, the bottom bracket has an axle hole, a down tube hole for communication with an interior of the down tube, two chain stay holes for communication with each of the two chain stays and two bellow tube holes for extension of a first bellow tube and a second bellow tube respectively received in the bottom bracket, and a rear end of the chain stay is provided with a rear wheel axle connector for connection to a rear wheel axle and the rear derailleur and having an inner tube received in one of the two chain stays, the corresponding chain stay and ambient air such that the first derailleur cable and the second derailleur cable are received in the cable tubes and extend to the first bellow tubes and the second bellow tubes respectively, the first derailleur cable in turn extends out of the bottom bracket and toward the extension hole of the inner tube for connection to the rear derailleur.

2. The bicycle frame as claimed in claim 1, wherein the bottom bracket has a positioning plate received inside the bottom bracket to position the first bellow tube and the second bellow tube.

3. The bicycle frame as claimed in claim 1, wherein the inner tube has a flared opening inside a corresponding chain stay so that the first derailleur cable is guided by the flared opening and extends out of the rear wheel axle connector from the extension hole for connection with the rear derailleur.

4. The bicycle frame as claimed in claim 2, wherein the inner tube has a flared opening inside a corresponding chain stay so that the first derailleur cable is guided by the flared opening and extends out of the rear wheel axle connector from the extension hole for connection with the rear derailleur.

* * * * *